July 30, 1968   E. L. STRAUSS   3,395,035
RESIN IMPREGNATED CERAMIC HEAT SHIELD AND METHOD OF MAKING
Filed Oct. 1, 1963   3 Sheets-Sheet 1

INVENTOR
Eric L. Strauss

BY *Littlepage, Quaintance & Way*

ATTORNEYS

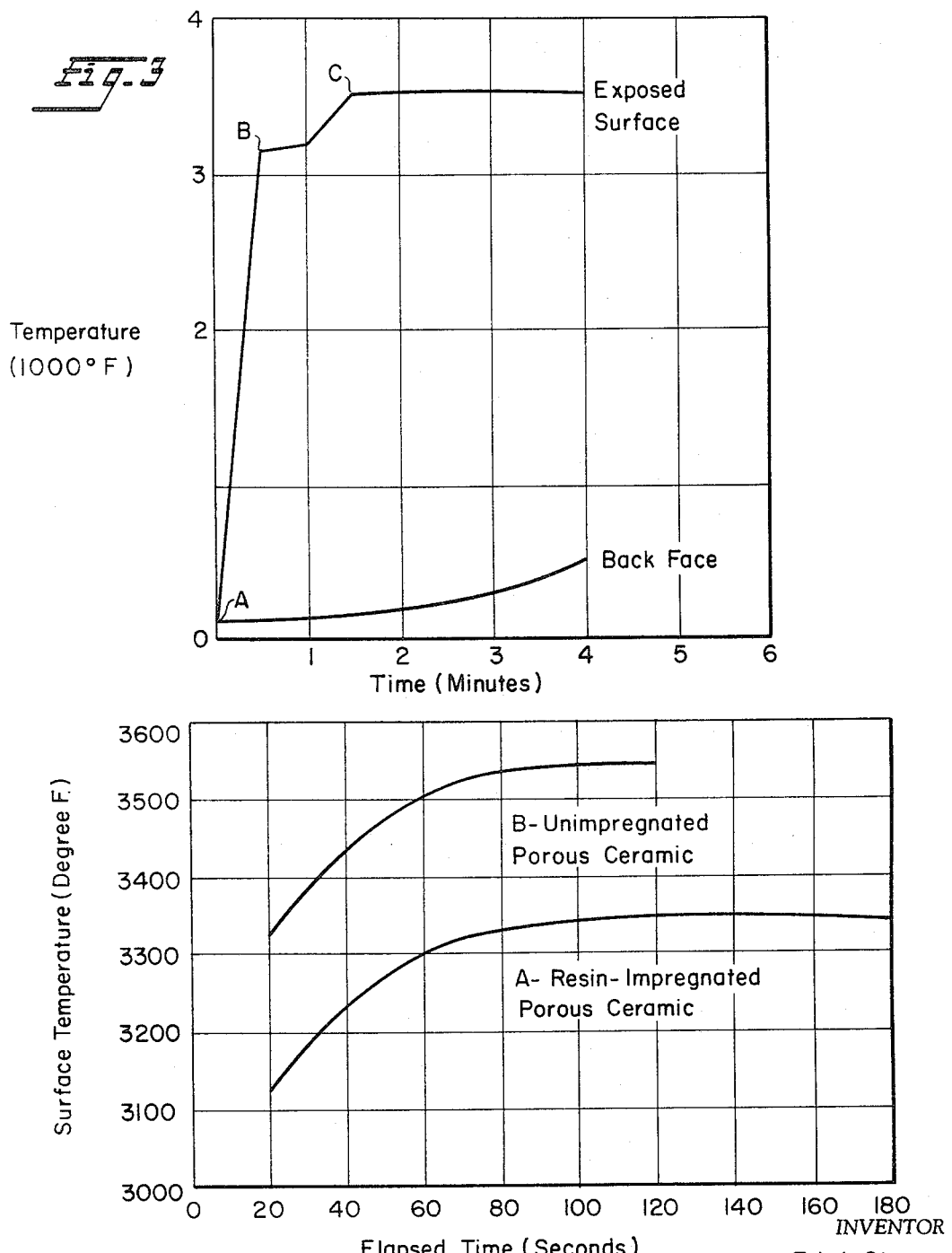

INVENTOR
Eric L. Strauss

United States Patent Office 3,395,035
Patented July 30, 1968

3,395,035
RESIN IMPREGNATED CERAMIC HEAT SHIELD AND METHOD OF MAKING
Eric L. Strauss, Baltimore, Md., assignor to Martin-Marietta Corporation, New York, N.Y., a corporation of Maryland
Continuation-in-part of application Ser. No. 17,691, Mar. 25, 1960. This application Oct. 1, 1963, Ser. No. 315,420
16 Claims. (Cl. 117—72)

This application is a continuation-in-part of application Ser. No. 17,691, filed Mar. 25, 1960, now abandoned.

This invention relates to heat shields suitable for use as a thermal protection for bodies subjected to severe thermal environments and especially to heat shields containing ablating materials within a continuous refractory matrix and combining the heat dissipating mechanisms of ablation and reradiation.

Since early history, man has used heat insulants in the form of clothing and housing to impede the flow of heat from hotter regions to colder regions. With the advent of "space age," the necessity of protecting bodies such as structural materials, vehicles, instruments and even man against exposure to excessive, or even dangerous temperatures when passing outwardly into space through the earth's atmosphere or upon returning to earth from outer space has raised the problems of shielding against heat to new dimensions.

For example, bodies which traverse the earth's atmosphere at hypersonic velocities experience temperatures in excess of 3000° F., principally in the stagnation regions and at the boundary layer transition point where flow changes from laminar to turbulent. Rocket nozzles, jet vanes and other parts in contact with a rocket exhaust stream encounter equally extreme thermal and erosive environments. There has developed a need, therefore, for heat shielding materials which possess the low thermal conductivity, high thermal stability and high temperature strength necessary to minimize heat flow to internal structures, instruments, fuel cells or crew compartments while retaining structural capabilities at temperatures in excess of 3000° F.

In order to protect hypersonic vehicles against the destructive effects of high temperatures encountered during the re-entry into the earth's atmosphere, various types of materials and structural configurations have been proposed under the general category of heat shields. Heat shields for satellites, glide re-entry vehicles and hypersonic lifting bodies must be capable of suitably disposing of heat fluxes in the range of 20 to 200 B.t.u./sec.-ft.$^2$ for periods up to 100 minutes. In the event of an aborted mission, even higher heat fluxes are associated with re-entry trajectories of escape capsules; however, these higher fluxes last for considerably shorter periods.

Ablation of reinforced plastics has been an extremely efficient thermal protection scheme for ballistic re-entry. Some of the special advantages possessed by ablating materials in the solution of heat shielding problems have been pointed out by Feldman, U.S. Patent No. 3,022,190, and in an article entitled "Growth Potential Defined for Heat Sink, Ablation Shields" by J. S. Butz, Jr. in Aviation Week, Sept. 7, 1959. On the other hand, under the lower heat fluxes and longer exposure times corresponding with shallower trajectories, heat transfer into the reinforced plastics exceeds the ablation rate, which causes thermal decomposition of the material under the surface, loss of strength at depths within the material, spalling, and breaking away of pieces.

It is undoubtedly true the subliming materials of Feldman will find particular areas of utility but they customarily are relatively dense materials, are impractical from cost viewpoint for extensive usage and, for the most part, sublime at a relatively low temperature which precludes significant rejection of heat by radiation.

Radiative shields require the use of refractory ceramics or metals like molybdenum, columbium and tungsten, capable of operating at high temperatures and dissipating heat by the cooling effect of re-radiation. Metals unfortunately, are severely attacked by oxidation, and no reliable protective coating for use above 3000° F. is available. Ceramics have the greatest potential as heat shield materials because of their thermal stability at high temperatures. Ceramics, though, are brittle, have low tensile strengths, and are susceptible to fracture under mechanical impact or thermal shock. Radiative shields are also limited in that they require auxiliary insulation and sometimes, cooling systems intermediate the shield and the structure being protected in order to maintain a reasonable temperature at the structure surface.

It is an object of this invention to provide a heat shield which possesses the desirable characteristics of the several types of prior art heat shields without their attendant undesirable limitations. In particular, the present heat shield is of low density, and possesses low thermal conductivity, high specific heat, impact and thermal shock resistance, thermal stability and low thermal diffusivity.

It is an important object of this invention to provide a heat shield which will not undergo a change in shape even though it utilizes in part the principle of ablation.

It is another important object of this invention to provide an improved ablative heat shield that retains its insulating properties and its structural integrity under low angle re-entry conditions.

Other objects and features of this invention will become apparent from the more detailed description taken in connection with the drawings wherein:

FIG. 3 is a typical time-temperature profile for the exposed surface and the back face of a heat shield subjected to a rectangular heat pulse.

FIG. 4 is a graph showing the temperatures generated on the exposed faces of (A) a block of resin-impregnated, zirconia-protected silicon carbide foam and (B) an unimpregnated zirconia-protected silicon carbide foam.

Figure 1:
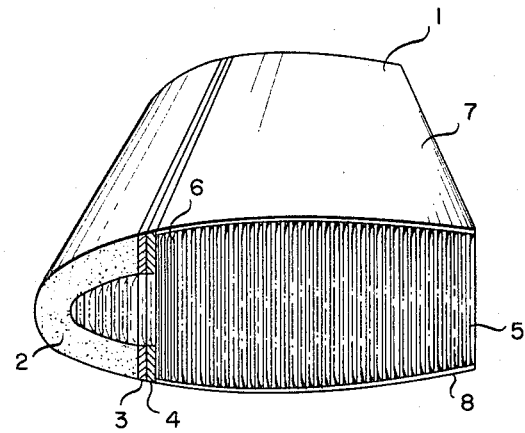
FIG. 1 is a partially cut-away perspective view of a resin-impregnated porous ceramic heat shield attached to an aerodynamic leading edge.

In accordance with the present invention there is provided a composite heat shield material comprising a porous, open-cell refractory ceramic having a porosity of at least 66%, impregnated with a resin in at least a portion of the cells of the ceramic. The addition of resin improves the mechanical strength, the thermal shock resistance of the relatively brittle ceramic and the insulating properties of the material without unduly increasing the weight of the composite so that the heat shields of the present invention may have densities as low as 50 lb./ft.$^3$. The ceramic-resin composite may be fabricated into a monolithic heat shield, or formed into smaller blocks or tiles which may be individually attached to a metal back-up structure.

I have discovered that by reducing the thermal conductivity of a heat shield to as low a level as possible, the re-radiated heat dissipation mechanism is considerably enhanced. Poor conductors transfer heat generated at the surface by air friction at a very slow rate. The concentration of heat at the surface rapidly increases the surface temperature and in turn rapidly increases the amount of heat radiated from the surface. Internal and backface temperatures of a resin-impregnated porous ceramic increase at a slow rate due to: (1) the material having a low diffusivity, (2) low thermal conductivity, (3) the high specific heat of the organic resin, (4) absorption of heat absorbed by melting and pyrolysis (bond rupture) of the resin and (5) the high specific heat of the products of pyrolysis. As a consequence, the temperature of the structure protected by the heat shield increases at a much slower rate than the temperature of the exposed heat shield. It is possible to maintain the backface of the heat shield at a temperature of about 500° F. or less when the exposed surface is heated to about 3000° to 4500° F. during reentry. The combination of increased surface radiation and decreased heat transfer through the body of the heat shield produces an improved heat shield.

It has also been found that the gaseous products of resin pyrolysis pass through the opened-cell porous ceramic and are injected into the boundary layer, thereby thickening the boundary layer and reducing heat transfer to the ceramic surface. By taking advantage of this mass transfer cooling principle, the heat shields of this invention are capable of withstanding heat fluxes that would normally melt or decompose the unimpregnated ceramic constituents.

The porous refractory materials used in this invention should have a thermal conductivity that is less than about 10 B.t.u.-in./hr.-ft.$^2$-° F. at 1000° F. In referring to the thermal conductivity of refractory ceramic materials, the porosity of the material must be considered. Table I lists the thermal conductivity of seven ceramics, and, for comparison, the thermal conductivity of graphite, copper, aluminum and iron. If one makes the arbitrary selection that 100 B.t.u.-in./hr.-ft.$^2$-° F. is the dividing line between good and poor thermal conductors and that a conductivity lower than 10 B.t.u.-in./hr.-ft.$^2$-° F. denotes a thermal insulator "material of low thermal conductivity" only zirconia and silica can be considered poor conductors in their dense form at room temperature and the same ceramics plus alumina, thoria and magnesia would be poor conductors in their dense form at 1000° F. The thermal conductivity of each of these materials can be greatly reduced by increasing its porosity. Therefore, even silicon carbide which is a good thermal conductor in its dense form is a thermal insulator in the highly porous (90%) form. On the basis that a thermal conductivity of 10 B.t.u.-in./hr.-ft.$^2$-° F. in the 70° to 1000° F. temperature range denotes the upper limit of a thermal insulator, a zirconia body of 50% porosity would qualify as a suitable refractory thermal insulator, while a silicon carbide body of 83% porosity would not. From the data given in Table I it can be deduced that a material whose conductivity in the dense form exceeds 1000 B.t.u.-in./hr.-ft.$^2$-° F. could not be produced in a highly porous form with a conductivity of less than 10 B.t.u.-in./hr.-ft.$^2$-° F. Therefore, materials such as beryllia, graphite, and metals such as aluminum and copper could not be made porous enough to be considered refractory materials usable in this invention.

TABLE I

| Material | Density (g./cc.) | Porosity (percent) | Thermal Conductivity (B.t.u.-in./hr.-ft.$^2$-° F.) | | |
|---|---|---|---|---|---|
| | | | 70° F. | 300° F. | 1,000° F. |
| Alumina | 3.79 | | 246 | 164 | 64 |
| Do | 3.12 | 23.4 | 164 | 126 | 48 |
| Do | | 48.7 | 111 | 84 | 29 |
| Alumina (foam) | 0.52 | 88 | | 4.8 | 3.8 |
| Beryllia | 2.85 | | 1,560 | 1,090 | 372 |
| Do | 2.29 | 25 | 960 | 606 | 246 |
| Do | 1.85 | 39 | 485 | 270 | 132 |
| Magnesia | 3.47 | | 276 | 204 | 90 |
| Silica (fused) | 2.2 | | | 10.8 | 26 |
| Silica (fused) (foam) | 0.34 | 84 | 0.45 | 0.75 | 2.0 |
| Silicon Carbide | 3.1 | | 870 | | 290 |
| Silicon Carbide (foam) | 0.56 | 83 | 14.3 | 8.6 | 5.7 |
| Do | 0.32 | 90 | | 5.0 | 5.5 |
| Thoria | 9.59 | | 101 | 78 | 37 |
| Do | 8.08 | 16.7 | | | 28 |
| Zirconia | 5.3 | | 11.5 | 11.8 | 12.5 |
| Do | 4.0 | 26 | | | 5.1 |
| Do | 2.8 | 50 | | | 3.4 |
| Do | 1.8 | 68 | | | 2.2 |
| Zirconia (foam) | 0.73 | 86 | | 0.8 | 1.1 |
| Graphite | 1.75 | 22.5 | 1,630 | | |
| Do | 1.68 | 25.7 | 1,190 | | 580 |
| Do | 1.41 | 37.5 | 550 | | |
| Carbon Steel | 7.87 | | 445 | 403 | 277 |
| Aluminum | 2.70 | | 1,540 | | |
| Copper | 8.96 | | 2,730 | | |

While zirconia constitutes the preferred refractory ceramic matrix, other refractory ceramic materials may be used, provided they have requisite high melting points (typically above 3000° F.), thermal stability in air and resistance to chemical attack at the high temperatures experienced in space technology. Also, the density of the ceramic should be as low as possible. From a practical standpoint, one would desire to use the most porous form of the refractory possible, because by increasing the porosity, the thermal conductivity and weight of the refractory are decreased. Volumetrically speaking, the refractory ceramic material will have a major proportion of pores and should have a porosity of at least 66% and preferably a porosity of 80% to 92%. A porosity of 92% is the maximum for a foam which retains structural integrity, especially after the resin which normally increases it strength has decomposed.

Suitable refractory ceramics may be selected from refractory oxides, carbides, silicides, borides and nitrides. The refractory ceramic material may consist of a substantially pure substance such as zirconium oxide or a combination of substances such as silicon carbide coated with a protective layer of zirconium oxide. Since certain substances would be unsuitable for use at very high temperature in oxidizing atmospheres, they may be protected in any suitable manner with another substance which will impart the necessary chemical resistance to the reactive substrate. Silicon carbide which is rapidly oxidized in air above about 3200° F. may be protected with an adherent coating of zirconium oxide, for example, so as to render it resistant to oxidation at temperatures well in excess of 3200° F. The combination of silicon carbide and zirconium oxide, therefore, is a "refractory ceramic material." Many other combinations of materials are, of course, contemplated and are not limited to this example.

In general, metal oxides are the most stable materials in air. Exceptions are CaO, NiO, TiO$_2$, BaO, SrO and Cr$_2$O$_3$. MgO and BeO are sensitive to water vapor at high temperatures. Metal carbides usually have poor oxidation resistance in air above 3000° F. except for SiC to about 3200° F. Carbides may be protected against oxidation by impregnation with a refractory material like zirconia, as is explained below in more detail. $CaC_2$, $Be_2C$ and $Al_4C_3$ are sensitive to water vapor which may make it impractical to utilize these materials. Nitrides generally have poor oxidation protection, but may be impregnated with a refractory material to render them oxidation resistant at high temperatures. $Be_3N_2$ and AlN are decomposed by water. Silicides, which form a protective $SiO_2$ film, generally have good oxidation resistance.

Exemplary high melting compounds for use as refractory materials in the present invention are:

(a) Oxides ($Al_2O_3$, $Y_2O_3$, $SiO_2$, $ZrO_2$, $HfO_2$, $ThO_2$)
(b) Carbides (SiC)
(c) Silicides ($MoSi_2$)
(d) Borides ($TiB_2$, $ZrB_2$)
(e) Nitrides (BN, $Si_2N_4$)

Other high melting compounds are, by way of example, complex oxides like mullite ($3Al_2O_3.2SiO_2$), Zircon ($ZrO_2.SiO_2$) and spinel ($MgO.Al_2O_3$).

The following table gives the properties of typical highly porous ceramics successfully used in the practice of the invention.

TABLE II.—PROPERTIES OF FOAMED CERAMICS USED IN HEAT SHIELDS

|  | SiC | $Al_2O_3$ | $ZrO_2$ | $SiO_2$ |
|---|---|---|---|---|
| Temperature Limit (° F.) | *3,500 | 3,300 | 4,000 | 3,000 |
| Porosity (percent) | 90 | 88 | 86 | 84 |
| Density ($\rho$) (g./cc.) | 0.32 | 0.52 | 0.73 | 0.34 |
| Thermal Conductivity (k) at 600° F. (B.t.u.-in./hr.-ft.$^2$-° F.) | 5.70 | 4.15 | 0.95 | 1.10 |
| $\rho k$ (B.t.u., lb./hr.-ft.$^4$-° F.) | 9.5 | 11.2 | 3.6 | 1.9 |
| Chemical composition (percent pure ceramic) | 96 | 97 | 97 ($ZrO_2$ and CaO) | 99.8 (Fused Silica) |
| Compression Strength (p.s.i.) | 200 | 930 | 240 | 770 |

* When treated with zirconia to prevent oxidation.

It will be appreciated that other high-melting oxides, carbides, nitrides and silicides which are thermally stable in air and resistive to chemical attack by air, either singly or in a suitable combination fall within the definition of refractory ceramic material.

The average cell size of the refractory ceramic should be at least 250 microns (.25 mm.). The preferred average cell size is approximately 1 mm. in diameter. Pores larger than 2 mm. in diameter are undesirable because the intimate contact area between the gaseous decomposition products and the hot cell walls needed to facilitate heat exchange cooling of the cell walls is reduced. In addition, the larger globules of resin in cells greater than 2 mm. in diameter would not decompose uniformly; instead, they would decompose around their periphery and remain undecomposed in the center. Cell sizes smaller than 250 microns are not desirable because bodies of the desired degree of porosity (80% to 92%) cannot be made with very small pores. This cell size is much larger than the minimum required for impregnation since pores of much smaller size can be impregnated by vacuum techniques.

Impregnation of the ceramic may be performed in any suitable manner. The resin, which may be thermo-plastic or thermosetting, must be in the liquid state, so that it may be injected into the ceramic; and, subsequent to impregnation, caused to solidify in the ceramic. The resin can be obtained as a liquid either in the unpolymerized state, or by dissolving it in a suitable solvent, or by preparing it in the form of a slurry or by melting. After impregnation, the resin may be polymerized, fused or otherwise solidified in situ, any solvents or liquid carriers having been previously evaporated off.

Resins which are liquid in the unpolymerized or partially polymerized condition must be capable of being polymerized either by heating or by catalysis, preferably without the application of pressure. However, if pressure is required for polymerization, this pressure must not exceed the compressive strength of the refractory ceramic substrate. Solid thermoplastic resins may be reduced to the liquid state for the purpose of impregnating the refractory ceramic by melting. Both solid thermoplastic and thermosetting resins may be dissolved in a suitable solvent or dispersed in a liquid carrier. In the latter case, i.e., where a slurry is used, the resin is fused by the application of heat after it has been placed in the refractory ceramic.

Examples of typical ablating organic resins are as follows:

| Resin Types | Class | Illustrative Chemical Derivations |
|---|---|---|
| Phenolics | Thermoset | Reaction of phenol and formaldehyde. |
| Melamines | do | Reaction of melamine and formaldehyde. |
| Polyesters | do | Co-polymer of an alkyd resin dispersed in styrene. |
| Epoxy | do | Reaction of epichlorohydrin with polyhydric compounds. |
| Phenyl-Silanes | do | Co-polymer of phenolic and silicone resins. |
| Polysiloxanes | do | Polymerization of monomer. |
| Acrylics | Thermoplastic | Reaction between acrylic acid and methyl alcohol. |
| Polyamides | do | Condensation product of a diabasic acid and a diamine. |
| Tetrafluoroethylenes | do | Polymerization of monomer. |
| Polyolefins | do | Polymerization of monomer such as ethylene and propylene. |

The preferred properties of the organic resins used are that they are liquids in unpolymerized or partially polymerized condition and that they polymerize to the solid state under the influence of heat, or heat and a catalyst, but without the application of pressure; the flammability of the resin being such as to render it self-extinguishing; and the resin being capable of sustaining a temperature of 500° F. for a short period of time without chemical breakdown. The pyrolysis of the resin at higher temperatures should occur with the absorption of at least about 100 B.t.u./lb.

In the study of resins as impregnants for porous ceramic heat shields for re-entry from orbital and super-orbital flight, it has been found that optimum shielding effect is obtained if such resins have a combination of properties, such as (1) high specific heat, (2) highly endothermic during decomposition and (3) the gaseous pyrolysis products have (a) a high specific heat and (b) possess a low molecular weight. These characteristics are generally present in thermoplastic polymers which have a high hydrogen content. Both for economic and theoretical reasons, the resins which fulfill these requirements most markedly are the substantially completely saturated homogeneous or heterogeneous thermoplastic hydrocarbons resins derived from one or more alpha olefins such as ethylene, propylene, butylene or the like.

However, when using a ceramic as a matrix for thermoplastic resins, it has been found that one may experience difficulty with the mechanical stability of the matrix. For instance, when porous ceramics which have been impregnated with thermoplastics such as polyethylene, nylon, polypropylene, polystyrene, polycarbonate and methylmethacrylate are tested in an oxy-acetylene torch, the ceramics may tend to split and crack either because of swelling of the plastic or because of rapid gas formation which builds up a high internal pressure. Damage to the cellular structure may, however, be alleviated by first impregnating the ceramic with a light cell wall coating of a thermosetting resin. Phenol-formaldehyde, phenyl-silane and silicone resins have been found suitable as cell wall coatings. In a typical application, the amount of resin used was approximately 0.15 grams per cubic centimeter of porous ceramic. This amount is controlled by adjusting the resin viscosity as required, either by the addition of solvents or by raising the resin temperature to obtain a low viscosity liquid, and allowing excess resin to drain off after vacuum impregnation. The cell wall coating resin may be cured and post cured to 450° F. for maximum thermal stability. The cell wall coating increases crushing strength of the porous ceramic between 4 and 10 fold. Even after pyrolysis of the resin, the carbonaceous residue will adhere to and strengthen the cell walls.

Since cell wall coating does not alter the open celled structure of the porous ceramic, a second impregnation can now be accomplished. This second impregnation is usually, a thermoplastic of the type previously mentioned, or it may be any other ablating material such as a thermosetting resin. Due to the high crushing strength of the cell wall-coated porous ceramic, it has become feasible to impregnate with thermoplastics by a compression molding technique at pressures of 100 to 200 p.s.i. If a thermosetting resin is utilized as the second impregnant, this resin need not be given the extended post cure since the cell wall coating has imparted adequate high temperature structural characteristics to the porous ceramic and the processing of the second impregnation can be governed by optimum thermal performance or ease of fabrication.

As previously stated, silicon carbide foam impregnated with zirconia is one preferred refractory material. Silicon carbide does not melt but dissociates into silicon vapor and graphite at temperatures above 4100° F. The dissociation is complete at 4900° F. Silicon carbide, however, reacts with oxygen to form $SiO_2$, $CO_2$ and CO. Between about 2400° F. and 3200° F. the $SiO_2$ fuses and coats the SiC substrate, thus reducing further oxidation to a small value. Oxidation again increases rapidly above 3200° F., probably due to $SiO_2$ decomposition.

Oxidation of silicon carbide foam is minimized by impregnating it with a zirconia slurry so that a thin layer of zirconia coats the cell walls. The zirconia may extend through the entire thickness of the silicon carbide foam or it may be confined to the area adjacent to the surface. The zirconia treatment also increases the strength of the foam and reduces its thermal conductivity, since the lower emissivity of the zirconia coating reduces radiative heat transfer within the cellular structure. Zirconia treated silicon carbide foam successfully withstands exposure to 3500° F. for periods exceeding ten minutes.

In the preferred method of applying zirconia to silicon carbide, a slurry consisting of 100 parts by weight of −325 mesh unstabilized zirconia and 30 parts of 85% orthophospheric acid was thinned with distilled water to a specific gravity of approximately 1.5. The silicon carbide was then completely or partially immersed in the thinned slurry until the latter has had sufficient time to penetrate the ceramic to the desired depth. Immersion time will vary according to the porosity and thickness of the ceramic and is readily determined. For a sample of 90% porous silicon carbide having an average cell size of about 250 microns and which is about 1½ inches thick, immersion time of 2 minutes is sufficient. Excess slurry was allowed to drain out of the foam to insure that the amount of zirconium oxide deposited in the cells did not clog up the cell openings when the part is later fired. Firing is preferably accomplished according to the following cycle; one hour at 200° F., 300° F., 400° F., 500° F., 600° F., 700° F., and 800° F., respectively, and at 900° F. for two hours, for a total firing time of 9 hours. After firing, the part is allowed to reach room temperature gradually. In the resulting article the zirconia deposited in the cell walls is chemically bonded to the silicon carbide to form a thin protective impervious layer which renders the whole substantially as refractory as the zirconium oxide coating.

The open-cell porous refractory ceramic part was next impregnated with a suitable resin or plastic material. For impregnating with a thermosetting resin such as phenol-formaldehyde resin 91–LD (American Reinforced Plastics Co.) and phenyl-silane resin 37–9X (American Reinforced Plastics Co.), the following method is preferred:

The resin is first heated to 160° F. to lower the resin viscosity to a suitably fluid level. The ceramic is then immersed in the resin and allowed to soak for five hours while the resin temperature is maintained at 160° F. The resin container is then placed into a vacuum bell jar for five minutes and pressure is reduced to a level of 1 inch of $H_2O$ or less. This permits trapped air bubbles to escape and removes some of the volatiles from the resin. The ceramic is then removed from the resin bath, its surfaces are scraped clean of resin, and it is tightly wrapped in cellophane. Small pin holes are punched in the cellophane to allow volatiles and water of condensation to escape during the cure. The wrapped sample is then placed in a rotating fixture, in an oven at 160° F. and rotated slowly (at 6–10 r.p.m.) for 36 hours. The wrapping is then removed and the sample is cured by raising the oven temperature from 160° F. to 200° F. in 15 minutes, then maintaining 200° F. for ½ hour, next raising the oven temperature to 275° F. in ½ hour and maintaining 275° F. for 1½ hours. The sample is then post cured for 8 hours at 300° F., 8 hours at 350° F., 8 hours at 400° F., and ½ hour at 450° F.

Referring now to the drawings, FIGURE 1 illustrates a heat shield of the present invention formed as a leading edge of wing 1. The leading edge comprises a resin-impregnated porous ceramic 2 of the type hereinbefore described, and is attached to wing 1 by means of a layer of suitable adhesive 3. Adhesive layer 3 bonds ceramic 2 to back up strip 4 which in turn is rigidly attached to metal honeycomb 5. Honeycomb 5 is densified as at 6 to afford increased strength at the point of attachment as explained in Pajak Patent 2,793,718. Aft of the leading edge, honeycomb 5 is covered by top and bottom metal skins 7 and 8.

Figure 2:
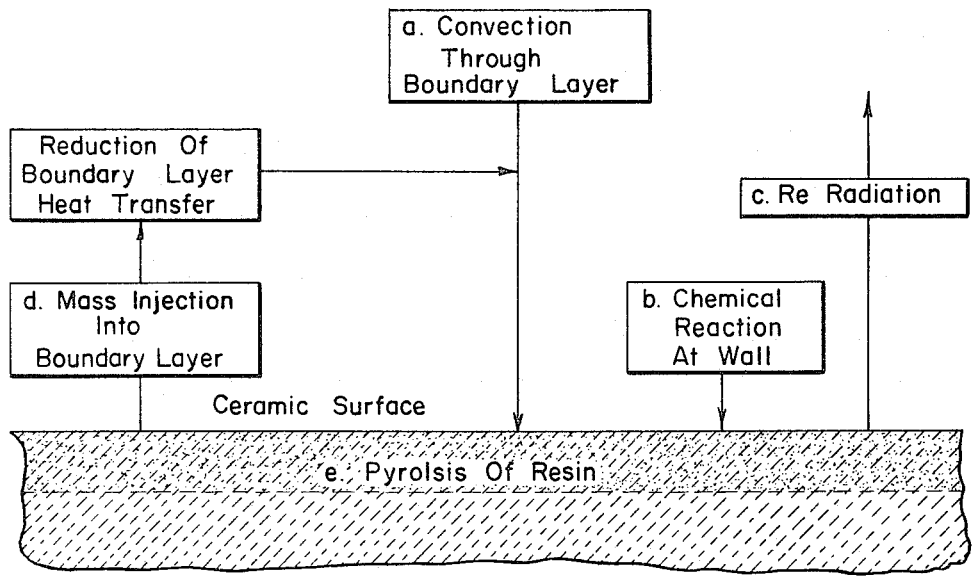
FIG. 2 is a block diagram illustrating the different modes of heat transfer at the surface of the heat shield.

The heat transfer mechanism which operates at the surface of the present resin-impregnated ceramic when subjected to aerodynamic heating involves several modes of heat transfer as shown in FIGURE 2. The modes of heat transfer to the heat shield are (a) convection through the boundary layer and (b) chemical reactions at the surface of the shield. This heat transmission is reduced by (c) re-radiation and (d) mass transfer cooling. The resin itself dissipates absorbed heat by (e) endothermic decomposition into a carbonaceous residue and into gaseous products which in turn are heated as they pass through the ceramic before being injected into the boundary layer.

The above modes may be related to a typical rectangular heating pulse cycle like the one presented in FIGURE 3, where two time-temperature curves are plotted. The upper curve indicates the temperature rise on the exposed surface of a flat resin-impregnated ceramic heat-shield, while the lower curve shows the temperature variation on the remote face of the shield.

During the time interval AB, the exposed surface is rapidly brought to a high temperature because substantially all of the heat transferred to the shield from the boundary layer is absorbed by the ceramic and resin at the surface. The temperature of the remote or back surface of the shield remains at its initial temperature during the time interval AB.

After time B, a very large percentage of the heat transmitted through the boundary layer to the shield is re-radiated to space. At the same time, endothermic pyrolysis of the resin is initiated, and the gaseous decomposition products are injected into the boundary layer to effect further cooling. As heating continues, resin beneath the surface pyrolyzes, continuing the flow of gases into the boundary layer. In passing through the porous ceramic on their way to the surfaces, these gases absorb additional heat. Further heat is absorbed by the heating of the ceramic, of the resin to its pyrolysis temeprature and by the carbonaceous products of pyrolysis as reflected by the internal temperature rise of the material. These four heat dissipating processes, viz., re-radiation, endothermic pyrolysis, heating of the resin-ceramic composite and its decomposition products and mass transfer cooling by the gaseous decomposition products, offset heat absorption from the boundary layer and from chemical reactions at the surface. Soon after the onset of pyrolysis, the surface of the shield reaches a stable temperature (point c), reflecting the establishment of a dynamic equilibrium between the various heat transfer processes.

It has been found that under a rectangular heating pulse, pyrolysis in resin-impregnated porous ceramic progresses in an orderly fashion through the thickness of the material, and that pyrolysis at any specific time during high-temperature exposure will only occur in a fairly narrow band of material. Consequently, pyrolysis in resin-impregnated porous ceramics is considered to be a quasi-steady process. Pyrolysis of phenolic and phenyl-silane resins produces a black carbonaceous residue with comprises 50% of the initial resin weight and clearly identifies the depth to which pyrolysis has progressed.

Specimens of resin-impregnated porous ceramic have been exposure-tested under simulated re-entry conditions in an oxyacetylene facility. Maximum surface temperatures of 2920° F. to 3940° F. were generated during exposures lasting from ½ to 18 minutes.

The effectiveness of mass transfer cooling is illustrated by testing a resin-impregnated and an unimpregnated porous ceramic specimen under identical conditions of rectangular pulse heating with the exception that the impregnated specimen was exposed for 60 seconds, the unimpregnated specimen, for 30 seconds. Each specimen was derived from a block of 2800° F. firebrick measuring 4½" x 2½" x 1½". The impregnated specimen contained 35% by weight of 91-LD phenolic resin. The impregnated specimen showed evidence of slight surface melting while the unimpregnated specimen exhibited severe melting and erosion.

In FIGURE 4 are compared the temperatures generated on the exposed faces of two pieces of silicon carbide foam, as set out in Table II, measuring 4¼" x 2½" x 1½" and treated with zirconia as previously described. The impregnated specimen A, contained 55% by weight 37-9X phenyl-silane resin. The equilibrium temperature of the resin impregnated piece was 200° F. lower than the equilibrium temperature for the unimpregnated piece, B. Although this difference is small, it is nevertheless significant since the enthalpy of the oxyacetylene envelope flame used in the test was relatively low. In a free-flight or plasma-arc environment the stagnation enthalpy would be considerably higher, and would greatly enhance the blocking effect of mass transferred into the boundary layer with an attendant decrease in the surface temperature of the impregnated specimen.

Figure 5:
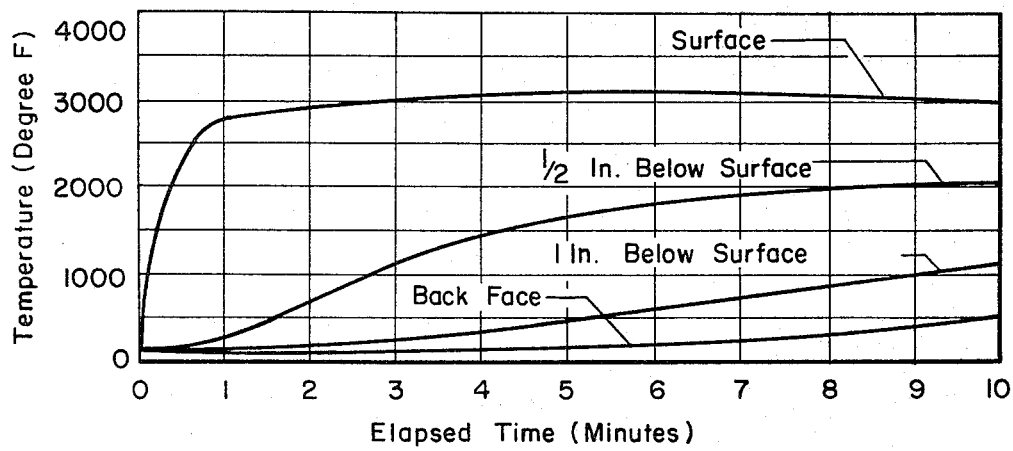
FIG. 5 is a typical graph of the time-temperature variation at various depths in a resin-impregnated porous ceramic subjected to constant-rate heating.

FIGURE 5 illustates the low net heat transfer rate of resin-impregnated ceramics. A 4½" x 2½" x 1½" block of 2300° F. firebrick, impregnated with 35.6% by weight of 37-9X phenyl-silane resin was exposed to a rectangular heating pulse which produced a surface temperature of approximately 3000° F. After an exposure of 10 minutes the back face temperature had risen only to a temperature of 480° F. Curves indicating the temperature of depths of 1 inch and 1½ inches below the exposed surface have been included to demonstrate the steepness of the temperature gradient across the specimen.

The fact that a relatively thin, low density resin-impregnated porous ceramic insulation exposed to re-entry environments is capable of maintaining the structure to which it is attached at temperatures below about 500° F., makes it possible to fasten the insulation to the understructure by means of a high temperature organic adhesive. The adhesive preferably would be of the same type as that used to impregnate the ceramic, but other suitable adhesives could be applied as a bonding agent.

Figure 6:
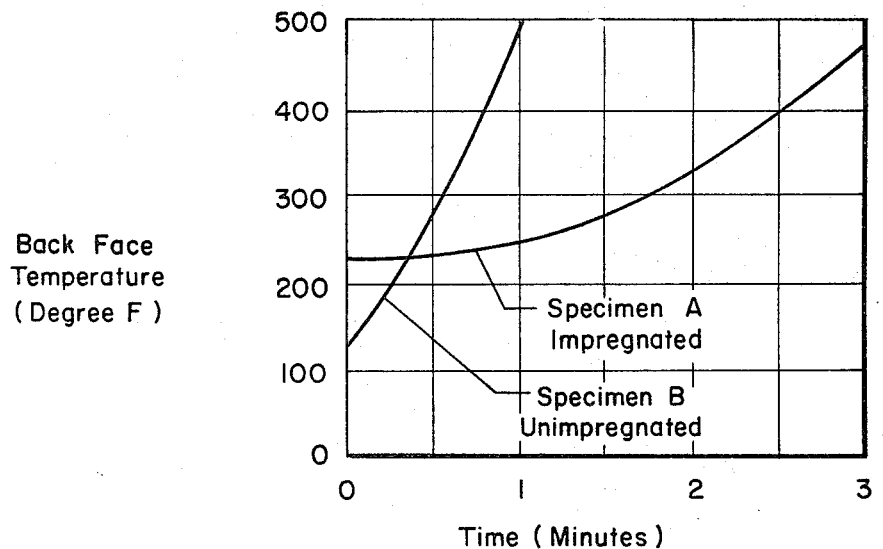
FIG. 6 is a graph showing the temperatures generated on the back faces of (A) a block of resin-impregnated zirconia-protected silicon carbide foam and (B) an unimpregnated zirconia-protected silicon carbide foam.

The temperature rise on the backface of a resin-impregnated (A) and an unimpregnated (B) porous ceramic are compared in FIGURE 6. Specimens A and B were each derived from a block of zirconia-impregnated silicon carbide foam. Specimen A contained 61.6% by weight of 37-9X phenyl-silane resin. The test pieces were exposed to an oxyacetylene torch under identical conditions so as to produce a surface temperature of 3400° F. The lower temperature rise rate exhibited by specimen A indicates its superior heat absorption capacity.

In most instances, the primary function of a heat shield is to protect and thermally insulate the underlying structure. The weight of shielding required to protect the vehicle structure during re-entry is one of the governing factors in selecting the heat shield material. Consequently, the emphasis often is on heat shield materials of low density which on an equal weight basis (lb. of weight per square foot of surface area) provide a thicker heat shield and lower heat conductance than heavier heat shield materials. Where protection is to take place over an appreciable period of time, the heat shield would be ½ inch or more thick and in many applications the heat shield would have to be 1 inch or more in thickness. In most instances, heat shields in excess of 1½ inch in thickness are not required. The use of a resin-impregnated ceramic heat shield, comprising a highly porous refractory body and a low density plastic, permits the use of the refractory material at a fraction of the density of the normal dense refractory body. For example, a resin-impregnated porous zirconia body of 1.45 g./cc. density has been produced. This density is less than ⅓ the density of ordinary zirconia.

The resin-impregnated ceramic heat shields produced by the present invention function as improved heat radiation shields. In order to be effective a high surface temperature must be attained; consequently the refractory ceramic must be a low conductor of heat. The resinous impregnant is added to increase the strength, the thermal shock resistance and decrease the effective thermal diffusivity of the composite structure. This approach differs from the Feldman U.S. Patent No. 3,022,190, who tries to obtain uniform distribution of heat through his coating by adding heat transferring materials such as graphite and metal in his coating. Fundamentally, applicant's main insulating cooling step is a re-radiation process and Feldman's main insulating cooling step is a sublimating process. Furthermore, the resinous impregnant used in resin-impregnated porous ceramics need not have a precise decomposition temperature such as those specified for Feldman's subliming compounds but are highly effective even when they decompose over a wide temperature range. The porous ceramic matrix will hold partially decomposed plastics in place and permit further decomposition as the temperature rises.

My invention makes full use of the physical fact that the radiant energy emitted by a surface, per unit time and per unit area, depends on the nature of the surface and on its temperature. At low temperatures the rate of radiation is small, but as the temperature is increased, the rate of radiation increases very rapidly, in proportion to the 4th power of the absolute temperature. For example, by increasing the temperature from 212° F. (373° K.) to 1832° F. (1273° K.) the radiation rate is increased by a factor of 130; at temperatures above 3000° F. the increase in the radiation rate is comparatively great.

Temperature control of a metal structure protected by a resin-impregnated porous ceramic heat shield of this invention, is attained by the exceedingly low thermal diffusivity of the composite which allows only a small quantity of heat to flow through the heat shield and into the metal structure. This heat shield concept is effective over fairly extended periods of time. My tests have shown that a resin-impregnated ceramic heat shield gives excellent thermal protection for periods of more than 25 minutes.

An important feature of the resin-impregnated porous ceramic heat shield is that it provides very efficient thermal protection over extended periods of time without undergoing a shape change. In the Aviation Week article by J. S. Butz, Jr. entitled "Growth Potential Defined for Heat Sink, Ablation Shields," the following statement appears, "At present there is one major question regarding ablation shields that may affect their use on some satellite re-entry vehicles. This is their ability to maintain their original shape and aerodynamic qualities as their surface is ablated away." This drawback is overcome by the use of resin-impregnated porous ceramics.

The foregoing discussion makes it apparent that many variations may be made in the illustrative details of this invention or the scope thereof as defined in the appended claims.

What is claimed is:

1. A heat shield comprising a mass of open pore porous refractory material having low thermal conductivity of less than about 10 B.t.u.-in./hr.-ft.$^2$-° F. at 1000° F. and having a porosity of at least 66% by volume impregnated with an ablating resin.

2. The heat shield of claim 1 wherein said ablating resin has a heat of pyrolysis of at least 100 B.t.u./lb.

3. The heat shield of claim 1, wherein said refractory material comprises a mass of a self-bonded, high-fired refractory ceramic material in a continuous phase defining a plurality of interconnected cells having an average size of not substantially exceeding 2 mm. in diameter.

4. The heat shield of claim 1 wherein the refractory material is made of at least one compound selected from the group consisting of oxides, borides, silicides, carbides and nitrides.

5. The heat shield of claim 4 wherein the refractory material is selected from the group consisting of mullite, zircon, silica, alumina, zirconia, thoria and silicon carbide; the silicon carbide being impregnated with a material selected from the group consisting of aluminum oxide and zirconium oxide so as to protect the silicon carbide from oxidation.

6. The heat shield of claim 1 wherein said ablating resin is a polymer selected from the group of resins consisting of phenolics, phenylsilanes, polyesters, epoxies, silicones, melamine-formaldehydes, acrylics, polyamides, tetrafluoroethylene, polyethylene and polypropylene.

7. The heat shield of claim 3 wherein said refractory ceramic being made of at least one compound selected from the group consisting of mullite, zircon, silica, alumina, zirconia, thoria and silicon carbide and silicon carbide being protected against oxidation by an adherent layer of an oxide selected from the group consisting of aluminum oxide and zirconium oxide, and a solid resin in at least some of said cells, said resin being a polymer selected from the group consisting of phenolics, phenylsilanes, polyesters, epoxies, silicones, melamine-formaldehyde, acrylics, polyamides, tetrafluoroethylene, polyethylene and polypropylene, said resin having a heat of pyrolysis of at least 100 B.t.u./lb.

8. The heat shield of claim 1, wherein said ablating resin is present in an amount equal to about 15% to 70% by weight of the heat shield.

9. The method of making a heat shield comprising the steps of preparing a mixture consisting of about 100 parts by weight of unstabilized zirconia about 30 parts by weight of orthophosphoric acid, and sufficient water to obtain a slurry with a density of about 1.5, impregnating a mass of high-fired, porous, open-cell silicon carbide with said slurry, said silicon carbide mass having a volume of pores at least twice the volume of silica carbide and an average cell size of at least about 250 microns, firing the impregnated ceramic so obtained so as to provide a thin adherent layer of zirconia on the walls of the cells of said ceramic, cooling said ceramic, impregnating the zirconia-impregnated silicon carbide to a predetermined depth with a liquid resin adapted to be polymerized to the solid state under a pressure less than the compressive strength of said ceramic, and solidifying said resin.

10. The method of claim 9 wherein said firing step is performed according to the following schedule: one hour at 200° F., 300° F., 400° F., 500° F., 600° F., 700° F. and 800° F., respectively, and two hours at 900° F.

11. The method of claim 9 wherein said resin is a polymer selected from the group consisting of phenolics, phenyl-silanes, polyesters, epoxies, silicones and melamine-formaldehydes, said resin having a softening point of at least about 500° F., a pyrolysis temperature of at least about 750° F., and a heat of pyrolysis of preferentially 500 B.t.u./lb. but at least 100 B.t.u./lb.

12. A method of making a resin impregnated-porous ceramic heat shield having improved structural integrity and low thermal conductivity comprising the steps of coating the pores of porous ceramic structure having a porosity of at least 66% by volume with a thermosetting resin, curing said thermosetting resin coating, then impregnating the coated cells with an ablating resin that fills the remaining volume of the coated cells.

13. The method of claim 12, wherein said thermosetting resin coating composition is in the form of a low viscosity liquid, and the excess liquid resin is drained off after impregnating the pores of the ceramic material.

14. A heat shield comprising a porous refractory base having low thermal conductivity and a porosity of at least 66% by volume, the porous cellular structure of said refractory base having a light cell wall coating of a cured thermosetting resin, the remaining volume of the porous cellular structure being filled with an ablating material.

15. The heat shield of claim 14, wherein said ablating material is selected from the group consisting of thermoplastic resins and thermosetting resins.

16. The heat shield of claim 14, wherein said porous refractory material has a thermal conductivity not greater than 10 B.t.u.-in./hr.-ft.$^2$-° F.

References Cited

UNITED STATES PATENTS

| | | | |
|---|---|---|---|
| 1,967,275 | 7/1934 | Williams | 117—148 X |
| 2,684,307 | 7/1954 | Knapman et al. | 117—54 X |
| 2,828,226 | 3/1958 | Goetzel et al. | 117—119 X |
| 2,835,107 | 5/1958 | Ward | 102—49 X |
| 2,874,071 | 2/1959 | Kadisch et al. | 117—169 X |
| 2,932,583 | 4/1960 | Grana | 117—61 X |
| 2,990,775 | 7/1961 | Henson | 102—92.5 X |
| 3,004,862 | 10/1961 | Winslow | 117—61 |
| 3,022,190 | 2/1962 | Feldman | 117—127 X |

OTHER REFERENCES

Rous, "Missiles and Rockets," vol. 111, No. 3, March 1958, pp. 91, 92, 95, 96, 98 and 100.

"Aviation Week," Sept. 7, 1959, reprinted by General Electric, p. 1B–36 (11–59), 6 pp.

MURRAY KATZ, *Primary Examiner.*